United States Patent
Zimmer

(10) Patent No.: US 7,260,848 B2
(45) Date of Patent: Aug. 21, 2007

(54) HARDENED EXTENSIBLE FIRMWARE FRAMEWORK

(75) Inventor: Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 902 days.

(21) Appl. No.: 10/120,865

(22) Filed: Apr. 10, 2002

(65) Prior Publication Data

US 2002/0169979 A1 Nov. 14, 2002

Related U.S. Application Data

(63) Continuation-in-part of application No. 09/854,174, filed on May 11, 2001, now Pat. No. 6,848,046.

(51) Int. Cl.
*G06F 11/00* (2006.01)

(52) U.S. Cl. .......................... 726/27; 705/18; 713/187; 714/763; 714/764; 714/765; 714/766; 714/767; 726/26; 380/200; 380/201; 380/202

(58) Field of Classification Search ............... 726/17, 726/1, 34

See application file for complete search history.

(56) References Cited

U.S. PATENT DOCUMENTS 5,109,329 A * 4/1992 Strelioff ....................... 710/261

(Continued)

FOREIGN PATENT DOCUMENTS

DE 199 46 959 A1 4/2001

(Continued)

OTHER PUBLICATIONS

Intel Corporation, "IS-64 System Abstraction Layer Specification," On Line Manual, Jan. 2000, XP002253057.

(Continued)

*Primary Examiner*—Kambiz Zand
*Assistant Examiner*—Roderick Tolentino
(74) *Attorney, Agent, or Firm*—Blakely, Sokoloff, Taylor & Zafman LLP

(57) ABSTRACT

A method for hardening an extensible firmware framework and system in which the framework is implemented. In accordance with the method, a resource access policy that defines rules to allow or disallow access to designated system resources, such as memory and I/O, is defined. During execution of firmware-based event handlers, event handler code may seek to access a designated system resource. In response thereto, access to the system resource may be determined based on a security status of a firmware-based event handler in consideration of any applicable rules defined by the resource access policy. For example, a resource access policy may allow only secure event handlers to access selected portions of memory, while preventing non-secure event handlers from accessing the same. In this manner, errant and malicious event handlers are prevented from damaging critical resources.

19 Claims, 11 Drawing Sheets

U.S. PATENT DOCUMENTS

| | | | |
|---|---|---|---|
| 5,671,422 A | 9/1997 | Datta | |
| 5,737,579 A | 4/1998 | Kimura et al. | |
| 5,949,882 A * | 9/1999 | Angelo | 713/185 |
| 6,032,256 A * | 2/2000 | Bernard | 726/34 |
| 6,088,804 A * | 7/2000 | Hill et al. | 726/25 |
| 6,193,422 B1 * | 2/2001 | Belt et al. | 713/320 |
| 6,453,278 B1 * | 9/2002 | Favor et al. | 703/27 |

FOREIGN PATENT DOCUMENTS

| | | | |
|---|---|---|---|
| EP | 0 924 610 A2 | 6/1999 | |
| EP | 0 924 610 A3 | 6/1999 | |
| WO | PCT/US 02/14776 | 9/2002 | |
| WO | PCT/US 02/14776 | 9/2003 | |

OTHER PUBLICATIONS

Intel Corporation, "Ingtel Architecture Software Developer's Manual-Chapter 11," On Line Manual, Jul. 2000, XP002253058.

Intel Corporation, "Extensible Firmware Interface Specification-version 1.05 Chapters 1, 16, 17," On Line Specification, Dec. 12, 2000, XP002253059.

* cited by examiner

HARDENED EXTENSIBLE FIRMWARE FRAMEWORK

RELATED APPLICATIONS

The present application is a continuation-in-part of application Ser. No. 09/854,174 "entitled SMM LOADER AND EXECUTION MECHANISM FOR COMPONENT SOFTWARE FOR MULTIPLE ARCHITECTURES," filed on May 11, 2001 now U.S. Pat. No. 6,848,046.

BACKGROUND OF THE INVENTION

1. Field of the Invention

The present invention concerns computer systems in general, and a scheme for hardening a System Management Mode (SMM) framework and other similar modes of processors in particular.

2. Background Information

Since the 386SL processor was introduced by the Intel Corporation, SMM has been available on IA32 processors as an operation mode hidden to operating systems that executes code loaded by BIOS or firmware. SMM is a special-purpose operating mode provided for handling system-wide functions like power management, system hardware control, or proprietary OEM-designed code. The mode is deemed "hidden" because the operating system (OS) and software applications cannot see it, or even access it.

IA32 processors are enabled to enter SMM via activation of an SMI (System Management Interrupt) signal. A similar signal called the PMI (Processor Management Interrupt) signal that is roughly analogous to the SMI signal is used for Itanium™-class processors. For simplicity, both SMI and PMI signals are sometimes referred to as xMI signals herein.

Most BIOS implementations that leverage the SMM capability of the foregoing Intel processors simply register a monolithic section of code that is created during the build of the BIOS to support a specific function or set of functions particular to systems that use the BIOS. This code comprises 16-bit assembly in IA32 and 64-bit assembly for Itanium processors. The monolithic code segments for these legacy implementations runs from beginning to completion in response to all xMI activations.

Recently, an extensible SMM framework has been introduced that enables the registration and execution of third-party SMM code, thus allowing SMM to perform operations that extend beyond those provided by the monolithic code solution. However, this presents a new problem. When a monolithic code segment is employed, its trustworthiness is inherent since it is BIOS provider. In other words, the SMM code can be trusted because if a BIOS vendor provided errant or malicious code, that vendor would soon be out of business. In contrast, the current extensible SMM framework, by itself, cannot protect against rogue or malicious code present in the third-party SMM code.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

Figure 1:
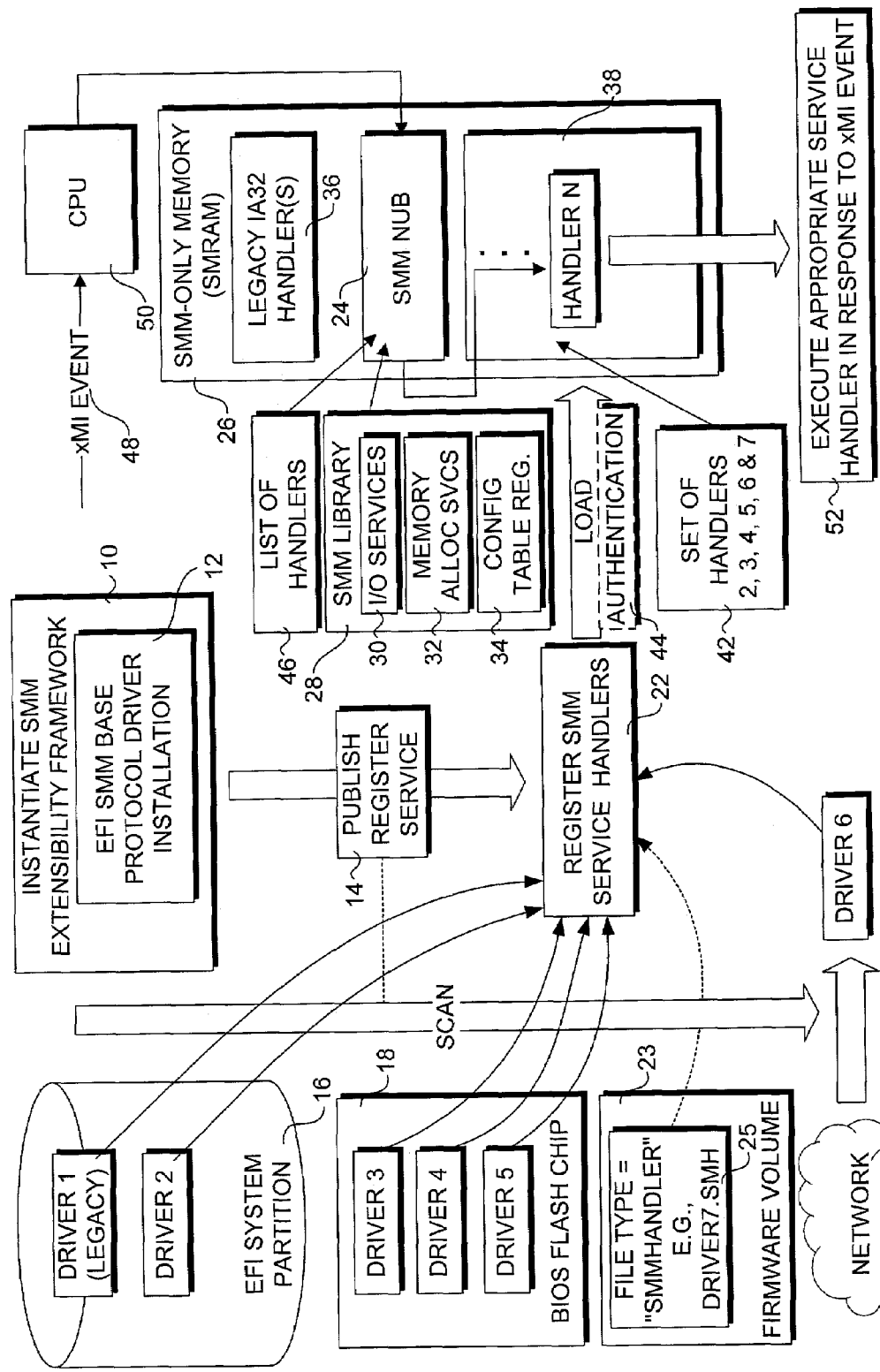
FIG. 1 is a schematic diagram illustrating an extensible firmware frame that enables various event handlers to be loaded into a hidden memory space and executed in response to an SMI or PMI (xMI) event.

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention provides a mechanism that hardens a hidden or operating system (OS) transparent processor operating mode. In the following descriptions, embodiments of the invention are discussed with referenced to the System Management Mode (SMM) of an Intel 32-bit family of microprocessor (i.e., IA-32 processors)

or the native mode of an Itanium-based processor with a PMI signal activation. However, this is not meant to be limiting, as the principles and teaching of the invention may be applicable to other processors that provide hidden or operating system (OS) transparent processor operating mode.

The state of execution of code in IA-32 SMM is initiated by an SMI signal, while that in Itanium™ processors is initiated by a PMI signal activation; for simplicity, these will generally be referred to as SMM. As discussed above, an extensible SMM framework has recently become available that allows for multiple drivers, possibly written by different parties, to be installed for SMM operation. An agent that registers the drivers runs in the EFI (Extensible Firmware Interface) boot-services mode (i.e., the mode prior to operating system launch) and is composed of a CPU-specific component that binds the drivers and a platform component that abstracts chipset control of the xMI (PMI or SMI) signals. The API's (application program interfaces) providing these sets of functionality are referred to as the SMM Base and SMM Access Protocol, respectively.

In conventional SMM implementations, SMM space is often locked by the platform software/firmware/BIOS via hardware mechanisms before handing off control; this grants firmware the ability to abstract the control and security of this binding. In contrast, the software abstraction via the SMM Access protocol provided by the extensible SMM framework obviates the need of users of this facility to know and understand the exact hardware mechanism, thus allowing drivers to be portable across many platforms.

As provided in further detail below, the extensible SMM framework includes the following features: a library in SMM for the drivers' usage, including an I/O access abstraction and memory allocation services; a means to communicate with drivers and applications executing in non-SMM mode; an optional parameter for periodic activation at a given frequency; a means to authenticate the drivers on load into SMM; the ability to close the registration capability; the ability to run in a multi-processor environment where many processors receive the xMI activation; and finally, the capability to run legacy IA-32 SMM code as a distinguished registered event handler. A characteristic of the system is that all event handlers run in the native processor mode of Itanium™ or in the case of IA-32, the framework will put the processor into flat 32 mode prior to invoking the event handlers, while running the optional legacy IA32 handler(s) in real-mode (i.e., 16-bit mode).

A high-level view of an implementation of an extensible SMM framework is depicted in FIG. 1. The implementation is enabled through use of the EFI framework, which defines a new model for the interface between operating systems and platform firmware. The interface consists of data tables that contain platform-related information, plus boot and runtime service calls that are available to the operating system and its loader. Together, these provide a standard environment for booting an operating system and running pre-boot applications.

The process for producing the SMM extensibility framework is initiated in a block 10, wherein The SMM extensibility framework is instantiated. This includes installing an EFI SMM base protocol driver in a block 12. The EFI SMM base protocol, SMM_BASE, is a CPU-specific protocol that is published by the CPU driver or another agency that can abstract the ISA (Instruction Set Architecture)-specific details of an IA-32 or Itanium processor. Once installed, SMM_BASE publishes an SMM handler register service in a block 14. Publication of the handler register service enables legacy and add-on drivers that are stored on various storage devices, including an EFI system partition 16, a BIOS flash chip 18 and on a storage device accessed via a network 20 to register SMM event handlers in a block 22. In addition to these types of storage devices, the drivers may be stored on other persistent storage devices that are accessible to the computer system in which the invention is implemented, including motherboard-based ROMs, option-ROMs contained on add-on peripheral cards, local hard disks and CD ROMs, which are collectively depicted by a firmware volume 23. (It is noted that EFI system partition 16, BIOS flash chip 18 and the remote storage device on which driver 6 resides also may comprise firmware volumes.) As depicted in FIG. 1, these drivers include a legacy driver 1 and an add-on driver 2 stored in EFI system partition 16, add-on drivers 3, 4, and 5, which are stored on BIOS flash chip 18, and an add-on driver 6 that is accessed from a remote storage device (e.g., file server) via network 20. As used herein, the term "add-on" corresponds to drivers and firmware files that were not provided with the original firmware of the computer system as provided by the original equipment manufacture (OEM) of that system.

In an optional mode, the EFI SMM base protocol driver may scan various firmware volumes to identify any drivers that are designated for servicing xMI events via SMM. In one embodiment, these drivers are identified by their file type, such as exemplified by a "DRIVER7.SMH" file 25 corresponding to an add-on driver 7.

During the installation of the EFI SMM base protocol driver, an SMM Nub 24 is loaded into SMRAM 26, which comprises an SMM-only memory space. As explained in further detail below, SMM Nub 24 is responsible for coordinating all activities while control is transferred to SMM, including providing an SMM library 28 to event handlers that includes PCI and I/O services 30, memory allocation services 32, and configuration table registration 34.

Registration of an SMM event handler is the first step in enabling the handler to perform a particular xMI event servicing function it is designed to perform. An SMM event handler comprises a set of code (i.e., coded machine instructions) that when executed by the system processor (CPU) performs an event service function in a manner similar to an interrupt service routine. Typically, each SMM event handler will contain code to service a particular hardware component or subsystem, or a particular class of hardware. For example, SMM event handlers may be provided for servicing errors cause by the system's real time clock, I/O port errors, PCI device errors, etc. In general, there may be some correspondence between a given driver and an SMM event handler. However, this is not a strict requirement, as the handlers may comprise a set of functional blocks extracted from a single driver file or object.

When the event handler for legacy driver 1 is registered, it is loaded into SMRAM 26 as a legacy handler 36. A legacy handler is an event handler that is generally provided with the original system firmware and represents the conventional mechanism for handling an xMI event. As each add-on SMM event handler is registered in block 22, it is loaded into an add-on SMM event handler portion 38 of SMRAM 26; once all of add-on event handlers are loaded, add-on SMM event handler portion 28 comprises a set of event handlers corresponding to add-on drivers 2-7, as depicted by a block 42. In addition, as each SMM event handler is registered, it may optionally be authenticated in a block 44 to ensure that the event handler is valid for use with the particular processor and/or firmware for the computer system. For example, an encryption method that implements a public key may be used. The driver herein would be signed with a private key and the SMM Core would ascertain the public key for the driver via an embedded certificate, etc., and perform the corresponding signature check of the incoming driver. One definition of "trust" herein could be the existence of the signed handler, a corresponding public key in the SMM Core, and the associated signatures matching. As SMM event handlers are registered, they are added to a list of handlers 46 maintained by SMM Nub 24.

Once all of the legacy and add-on SMM event handlers have been registered and loaded into SMRAM 26 and proper configuration data (metadata) is written to SMM Nub 24, the SMRAM is locked, precluding registration of additional SMM event handlers. This system is now ready to handle various xMI events via SMM.

Figure 2:
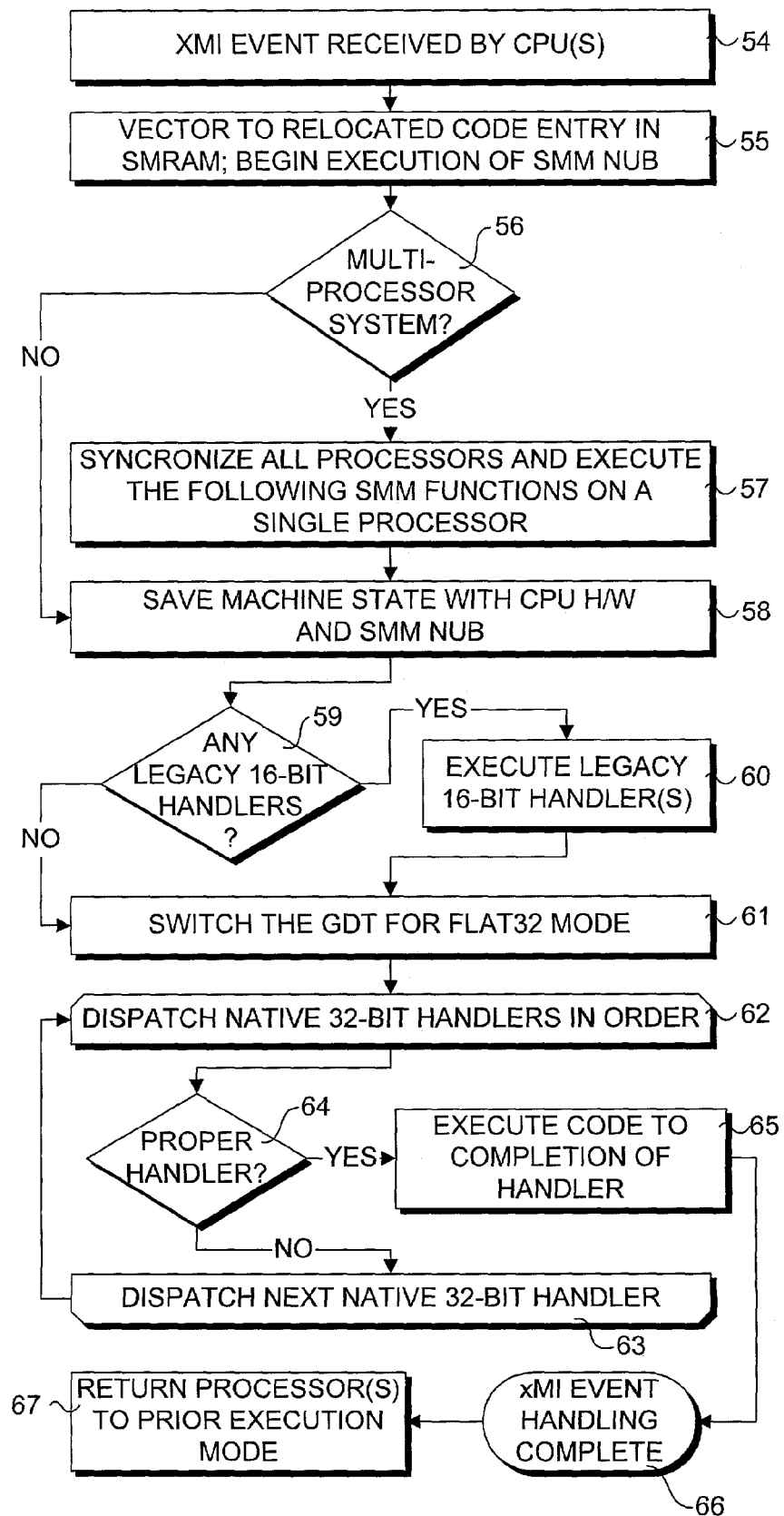
FIG. 2 is a flowchart illustrating the logic used when handling the an xMI event in accordance with a non-hardened extensible firmware framework.

With reference to FIGS. 1 and 2, the conventional process for handling an xMI event with an IA-32 processor proceeds as follows: In a block 54, an xMI event signal 48 is received by a CPU 50. In an IA32 multiprocessor environment, the xMI event signal is received by each of the processors. In general, for IA-32 processors, an xMI (SMI) event may be generated in response to activation of a pin on the system chipset, bus cycle type, or inter-processor interrupt (IPI) that cause an IA-32 processor to enter SMM. For Itanium™ processors, an xMI (PMI) event may be generated in response to activation of a pin on the system chipset, bus cycle type, or an IPI that causes an Itanium™ processor to return to Physical Mode and execute code registered with the PAL (Processor Abstraction layer) for servicing PMI events.

In response to the xMI event, CPU 50 switches to SMM mode and redirects the instruction pointer to the first instruction in SMM Nub 24, wherein the SMM Nub begins executing, as provided by a block 55. In a decision block 56, a determination is made to whether the system is a multi-processor system. If the answer is yes, all of the processors are synchronized in a block 57, whereby all but a selected processor (e.g., the first processor that is identified during the pre-boot process) are halted while the SMM Nub in the selected processor is executed. The machine state of each CPU is then saved by both the CPU hardware and the SMM Nub 24 in a block 58.

Next, in a decision block 59, a determination is made to whether there are any legacy 16-bit handlers that have been registered and loaded. If there are, the code corresponding to those legacy handlers is executed in a block 60. The machine execution mode is then switched to a Flat32 protected mode in a block 61. The protected mode comprises a flat 32-bit mode with non-paged 32-bit, zero-based addressing.

Once the execution mode switch has been completed, native 32-bit handlers are dispatched in order until an appropriate event handler is executed to completion to service the xMI event, as provided by start loop and end loop blocks 62 and 63 in FIG. 2 and a block 52 in FIG. 1. In one embodiment, the event handlers are stored as a linked list that is traversed in order from top to bottom, wherein a first event handler is dispatched and additional event handlers are dispatched as needed. Each event handler contains a first portion of code that is used to determine if that handler is the proper handler for servicing the xMI event, as provided by a decision block 64. A typical determination of this sort comprises interrogating the hardware component, subsystem, etc. corresponding to the event handler to see if an error has occurred for that object. If an error has occurred, the event handler is executed to completion in a block 65, whereupon it returns a code to the SMM Nub indicating that it has serviced the xMI event in a return block 66. If the event handler determines that its corresponding device did not cause the error, it returns a code to the SMM Nub indicating such, and the SMM Nub dispatches the next event handler in the list. This process is repeated until the appropriate event handler is executed.

Upon acknowledgment of the xMI event being handled, SMM Nub restores the machine state and executes an appropriate instruction (RSM for IA32) (RFI for IA-64) for the processor/all processors to return the processor(s) to its/their previous processing mode in a block 67.

Figure 3:
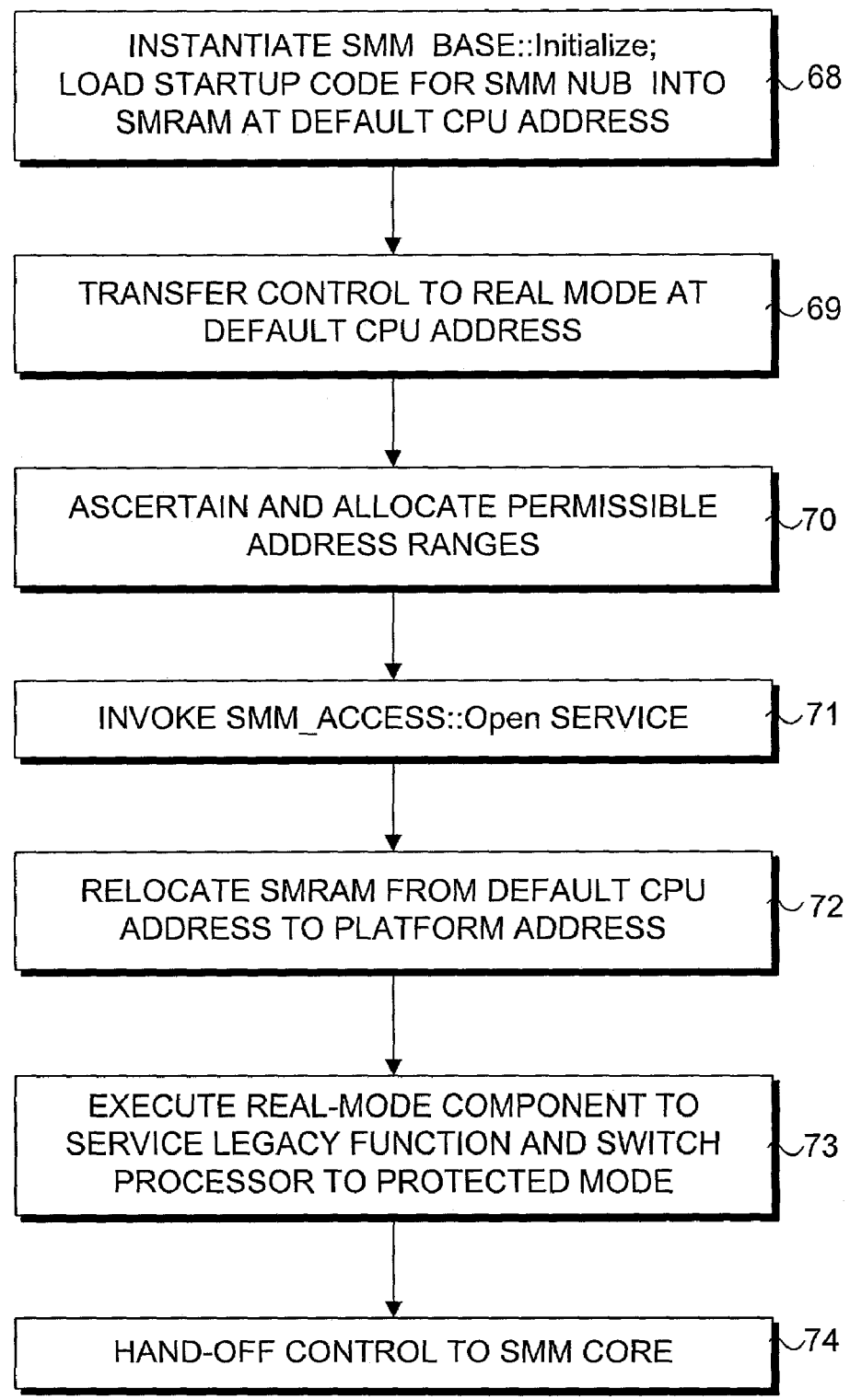
FIG. 3 is a flowchart illustrating the logic used when loading and launching execution of an System Management Mode (SMM) Nub that is used to manage event handling when a processor is operating in SMM.

With reference to FIG. 3, the EFI SMM base protocol driver (SMM_BASE) for IA-32 processors is installed through the following process. First, an SMM_BASE::Initialize service is called in a block 68. This is implemented with a DXE (Driver Execution Environment) Boot-Service driver that loads and exports this constructor.

In response to instantiating the driver, the startup code for SMM Nub 24 is loaded into SMRAM at the CPU default SMRAM address (0x3000-segment, offset 0x8000) while operating in protected mode. The processor mode is then transferred to real-mode at the execution address 0x38000p in a block 69. Next, in a block 70, the permissible address ranges for the platform's SMRAM implementation is ascertained and allocated. This information may be obtained by calling the SMM_ACCESS::GetCapabilities and SMM_ACCESS::AcquireSmramRange methods with the SMM_BASE::Initialize driver, as described below. If this driver doesn't exist, then the default policy will be 0xA000-seg for IA32 processors and runtime-data for Itanium™ processors, with a default size of (128 Kbyte for IA32 and 256 Kbyte for Itanium™).

After the address range has been allocated, the SMM_ACCESS::Open service is invoked in a block 71 and the initial address for the SMRAM is relocated from the default CPU address (0x38000p) to the platform address in a block 72. The relocated code will include a real-mode component and a protected mode component. The real-mode component will comprise the SMMEntry into the SMRAM relocation address. In a block 73, this code is executed to perform any legacy services, as necessary, and switch the processor to protected mode operation. Control is then handed off the SMM core in a block 74.

Figure 4:
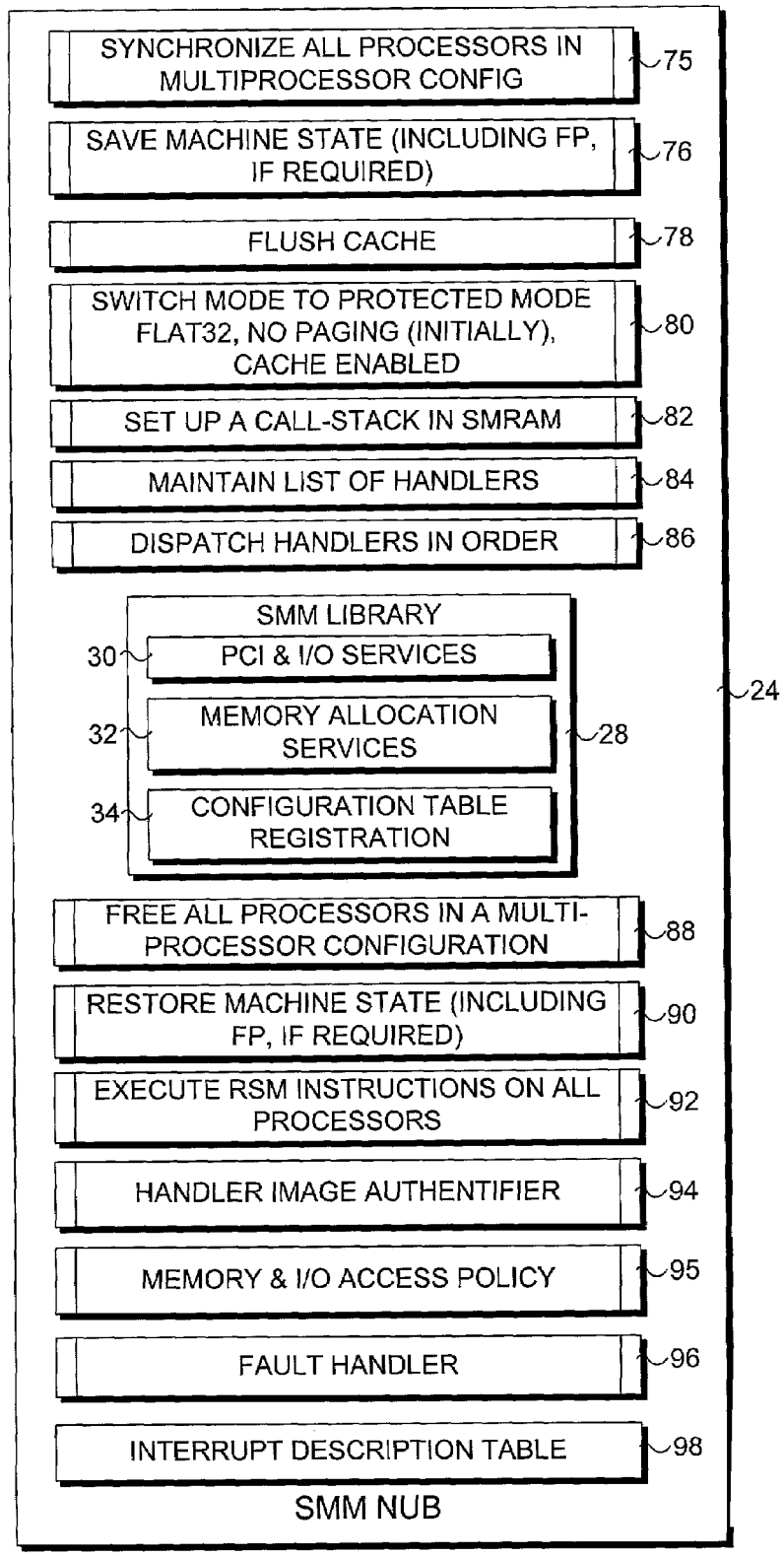
FIG. 4 is a block diagram illustrating various operation and service components of the SMM Nub.

As discussed above, SMM Nub 24 is responsible for coordinating activities while the processor is operating in SMM. The various functions and services provided by SMM Nub 24 are graphically depicted in FIG. 4. These functions and services include synchronizing all of the processors for multiprocessor configurations, saving the machine state, including floating point registers, if required, and flushing the cache, as provided by function blocks 75, 76, and 78. The SMM Nub also provides a mode switching function 80 that switches the processor mode from real mode to protected mode, as discussed above with reference to block 73. Mode switching function 80 also enables the processor's internal cache. Other functions provided by SMM Nub 24 include setting up a call-stack in SMRAM 26, maintaining a list of handlers, and dispatching the handlers in order, as depicted by function blocks 82, 84, and 86.

SMM Nub 24 provides a set of services to the various event handlers through SMM library 28, including PCI and I/O services 30, memory allocation services 32, and configuration table registration services 34. In addition, SMM Nub 24 provides several functions that are performed after the xMI event is serviced. If the computer system implements a multiprocessor configuration, these processors are freed by a function 88. A function 90 restores the machine state of the processor(s), including floating point registers, if required. Finally, a function 92 is used to execute RMS instructions on all of the processors in a system.

In accordance with aspects of the present invention, the SMM Nub includes four additional components. These components include a handler image authenticator 94, a Memory and I/O access policy 95, a fault handler 96, and an Interrupt Description Table (IDT) 98. As described below in further detail, these components is involved in hardening the extensible SMM framework by working in cooperation with other SMM components to prevent untrustworthy SMM handlers from accessing memory and I/O resources that are marked to be protected from such access.

As discussed above, the extensible SMM framework provides two mechanisms for loading event handlers: (1) driver-based installation; and (2) autonomous load from the firmware volumes. For driver-based installations, the SMM_BASE protocol shall be installed by a driver that is loaded by the DXE dispatcher. After the SMM_BASE protocol is installed, it publishes an interface that enables event handlers to be registered and loaded. The protocol for registration is described by the EFI1.0 specification, which defines a mechanism for publishing new callable interfaces in the EFI environment. The SMM_BASE protocol publication essentially comprises exposing the API described in the SMM-CIS (the SMM "Component Interface Specification," or EFI2.0 document describing the EFI2.0 Protocol or API set that abstracts this registration mechanism in the pre-boot space) with the EFI core. The EFI core maintains a protocol database of GUID/interface pointer pairs. The GUID comprises a 128-bit globally-unique ID of the interface, while the Interface pointer points to an interface definition that further defines the functions provided by each EFI components.

Through this mechanism, any driver that wishes to install event handlers, wherein in one embodiment an event handler is some code that can be PE32+ binary in the IA32 or Itanium™ instruction set, or legacy 16-bit handlers for IA32, can use the standard mechanism of EFI1.0 to discover the SMM_BASE protocol instance (via the core service "LocateProtocol") or register a notification with the EFI core to be alerted when the SMM_BASE protocol is installed. In either case, once the SMM_BASE protocol is installed, various drivers can marshall the interface pointer to the SMM_BASE instance (via the EFI1.0 "HandleProtocol service") and then invoke the SMM_BASE::Register service. The binary code that the driver consuming the SMM_BASE service uses can be ascertaining from its own driver image, a file from disk or network. The file can be in the firmware volume or on the FAT disk partition. Registration of event handlers is further facilitated by an SMM_BASE::Register service. This service comprises a DXE Boot-Service driver that permits registration of an event handler.

Figure 5:
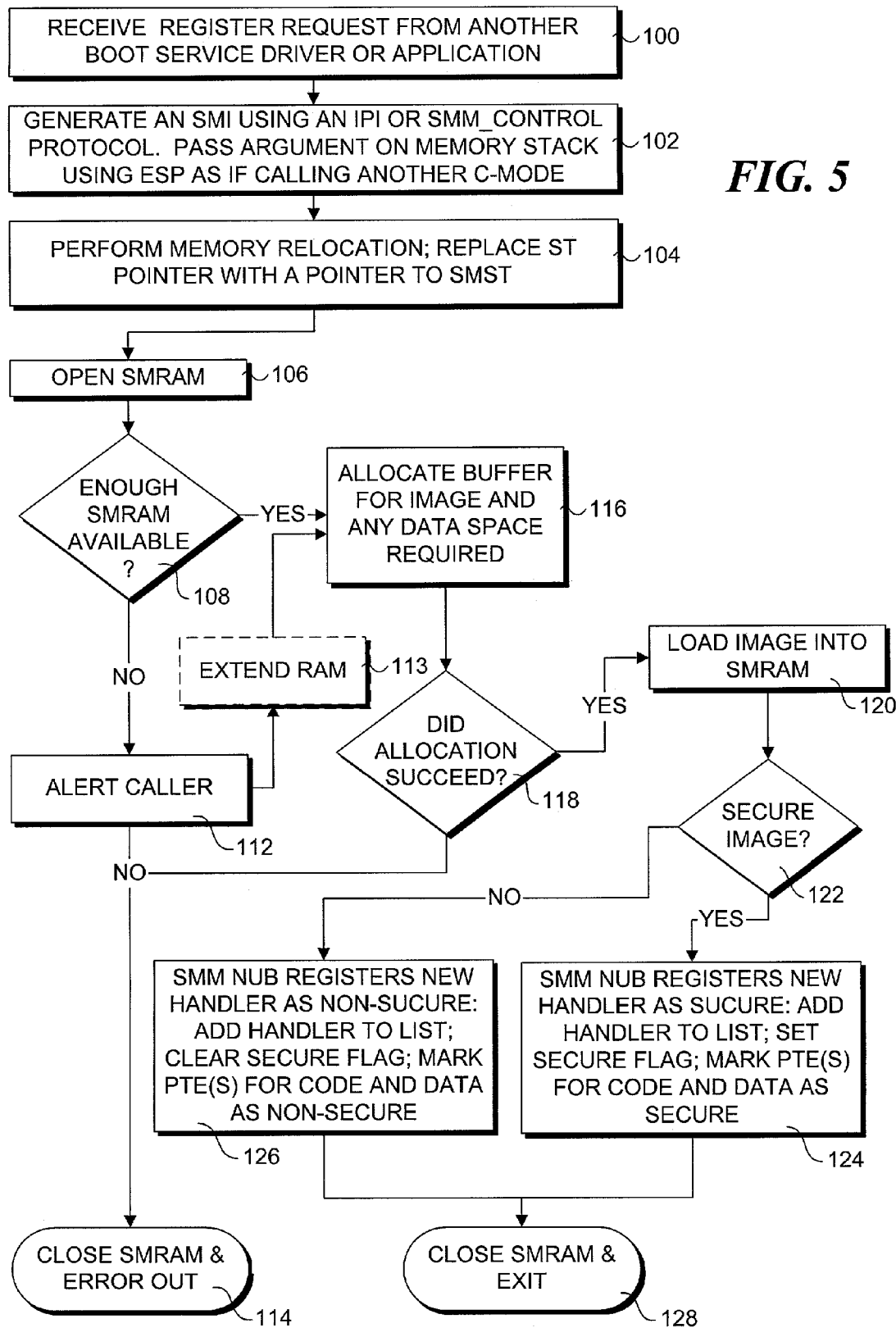
FIG. 5 is a flowchart illustrating operations and logic when loading and registering an event handler in accordance with one embodiment of the invention.

With reference to FIG. 5, the process for registering an xMI event handler begins in a block 100, wherein a request to register an event handler is received by the SMM_BASE protocol driver from another boot service driver or application (e.g., drivers 1-7). In response, an SMI is generated in a block 102, using an IPI or SMM_CONTROL protocol. The argument is passed on the memory stack using the ESP memory stack pointer as if calling another handler. The handlers can be written in C, with the generated image corresponding to the PE32+ format. Next, in a block 104, memory relocation is performed and the ST (System Table from EFI1.0) pointer is replaced with a pointer to the SMST (System Management System Table).

Next, the SMRAM is opened in a block 106 using the SMM_ACCESS::Open service, which is access through the SMM_ACCESS protocol. Further details of SMM_ACCESS protocol are provided in the APPENDIX that follows. The SMM_ACCESS::Open service abstracts programming of the memory controller to enable visibility of the SMRAM from non-SMRAM based code. This enables the SMM_BASE protocol to copy and install code, such as the SMM Nub, into SMRAM.

Next, in a decision block 108 a determination is made to whether enough SMRAM is available to hold the event handler routine and any additional memory space the routine may require during its operation. If not enough SMRAM memory space is available, the logic proceeds to a block 110 in which the caller is alerted. As an option, in response to being alerted, the caller may use the SMM_ACCESS::GetCapabilities and SMM_ACCESS::AcquireSmramRange method to acquire additional memory space within the SMRAM. If there is not enough SMRAM memory space available, the SMRAM is closed by calling the SMM_ACCESS::Close method and an error code is returned to the caller in an error return block 114.

If it is determined that there is enough SMRAM memory space available, a memory buffer for the SMRAM image of the handler is allocated in a block 116. A determination to whether the allocation succeeded is made in a decision block 118. If the allocation wasn't successful, the logic proceeds to error return block 114. If the allocation is successful, an image of the event handler is loaded into the SMRAM memory space that had been previously allocated in a block 120.

In accordance with SMM framework hardening aspects of the invention, a memory access mechanism is provided that prevents event handlers that are deemed to be non-secure (i.e., non-trusted)) from accessing memory allocated to and/or by trusted code. Generally, this trusted code may include the SMM Nub in the SMRAM, and trusted code in other portions of the systems main memory, such as EFI core components and an operating systems kernel. In one embodiment, the trusted code may include event handlers that are deemed as secure.

Figure 6:
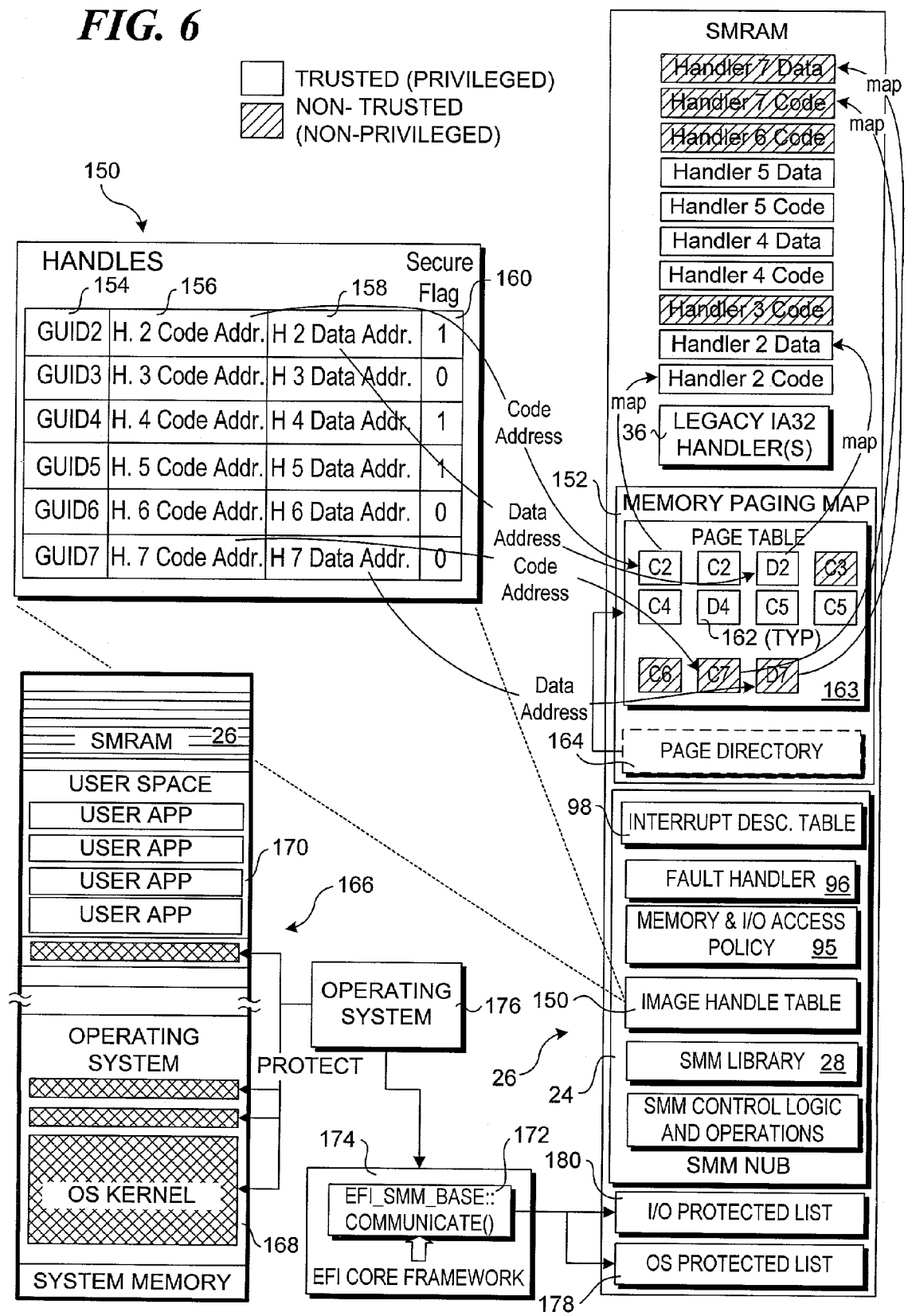
FIG. 6 is a block schematic diagram illustrating details of an event handler image handle table and memory paging map that are used to selectively allow access to system resources based on a corresponding resource access policy.

In one embodiment, a "gatekeeper" mechanism that controls memory access while operating in SMM mode is used to implement the foregoing memory access scheme. With reference to FIG. 6, the gatekeeper mechanism uses data contained in an image handle table 150 in conjunction with a memory paging map 152 to define which portions of SMRAM memory are privileged and non-privileged. In general, memory corresponding to trusted SMM components will be privileged, while memory corresponding to non-trusted components will be deemed as non-privileged.

Image handle table 150 includes a plurality of rows of data, wherein each row contains data pertaining to a respective event handler image. In one embodiment, the table includes a GUID (global unique identifier) column 154, a handler address code address column 156, a handler data address column 158, and a secure flag column 160. Upon registration of an event handler image with the SMM core, a GUID is assigned to the image and stored in GUID column 154. The GUID provides a "handle" for accessing its associated event handler. The address of the first instruction corresponding to a given event handler image is stored in handler address code address column 156. Similarly, the address corresponding to a base memory location of any memory that was allocated for data purposes for the event handler is stored in handler data address column 158. A Boolean flag identifying whether a event handler is deemed to be secure or non-secure is stored in column 160. In one embodiment, image handle table 150 also is used to store list of handlers 46. In one embodiment, the data contained in image handler table 150 are stored in a linked list.

In one embodiment, memory paging map 152 is configured to include a plurality of page table entries 162 in a page table 163 that are used to map the SMRAM address space used to store the event handler images and any corresponding memory that has been allocated for data purposes. The PTEs may also be used to map out the portion of SMRAM occupied by other SMRAM components, including SMM Nub 28. In general, memory-paging map 152 may be configured to correspond to a portable (i.e., processor architecture independent) memory paging scheme, such as the PMAP memory paging scheme developed for the MACH micro-kernel at Carnegie Mellon University in the late 1980's, or similar portable memory paging schemes used in various modem operating systems. Optionally, the memory-paging scheme may be particular to the type of processor being used to support SMM operations. For example in one embodiment, the memory-paging scheme may also implement a page directory 164 in addition to page table 163.

In one embodiment, each page table entry includes indicia that identifies whether the memory page corresponding to the PTE holds privileged or non-privileged memory. Typically, the indicia may include data defined by one or more bits contained in the PTE. For example, in one embodiment a Supervisor/User bit is set in the PTE to indicate that the page holds privileged memory, and cleared if the page holds non-privileged memory.

Returning to the flowchart of FIG. 5, the next portion of the flowchart pertains to hardening the SMM framework. First, a determination is made to whether the image corresponds to a secure (i.e., trustworthy) event handler in a decision block 122. In one embodiment, this determination is made by handler image authenticator 94, which attempts to authenticate the event handler via a digital signature. In general, the digital signature scheme should ensure that any event handler image that has been altered since it was originally signed by its developer will be identified as invalid. In one embodiment of the invention, the digital signature is based on the public key infrastructure X.509 standard3. Handler image authenticator 94 may store the public key using one of several well-known encryption techniques to perform the signature check.

If the image is determined to be secure, the logic proceeds to a block 124 in which the SMM Nub registers the event handler as a secure handler. In one embodiment, this comprises adding in entry in image handle table 150, setting the Boolean value in secure flag 160 column to "1"; and marking any page table entries (PTEs) corresponding to memory pages allocated to the event handler image and any data pages allocated to the event handler as privileged.

If the image is determined to be non-secure, the logic proceeds to a block 126 in which the SMM Nub registers the event handler as a non-secure handler. In accordance with the foregoing embodiment this comprises adding in entry in image handle table 150, setting the Boolean value in secure flag 160 column to "0", and marking any page table entries (PTEs) corresponding to memory pages allocated to the event handler image and any data pages allocated to the event handler as non-privileged. After completion of the operations in either of blocks 124 or 126 the logic proceeds to a return block 128 in which SMRAM is closed and the procedure exits.

In one embodiment, the memory access protection scheme may be extended into the run-time environment, such that gatekeeper operations are performed to allow or deny access to memory contained in the non-SMRAM portion of the system memory. A typical system memory configuration 166 is shown in FIG. 6, which includes an operating system space 168, a user space 170 in which code and data corresponding to user applications are stored, and an SMRAM space 26. For simplicity, each of operating system space 168 and user space 170 are shown as contiguous; in actual use, these spaces may typically comprise non-contiguous portions of the system memory.

In many modem operation systems, memory is segregated into privileged and non-privileged portions. Typically, privileged memory may only be accessed by the operating system, while non-privileged memory may be accessed by the OS or user applications. In accordance with this scheme, one embodiment of the invention provides a mechanism to enable protection of the operating system's privileged memory, while enabling secure event handlers to access non-privileged memory. In one embodiment, this protection mechanism is enabled through use of an EFI_SMM_BASE::Communicate( ) method 172 provided by an EFI core framework 174, which allows an operating system 176 to define a list of memory pages or ranges to deny access to, and store the list in the SMRAM, or make the location of the list known to the SMM Nub (e.g., through a pointer) so that it can be retrieved while in SMM. In one embodiment, the list of pages or ranges is stored as a linked list in SMRAM 26, as depicted by an OS protected list 178 in FIG. 6.

In accordance with further aspects of the invention, a mechanism is also provided to enable selected I/O ports to be protected. Generally, the decision on which I/O ports to protect may be made by EFI core framework 174, or by operating system 176. In a manner similar to that described above, the EFI core framework or the OS, as applicable, invokes the EFI_SMM_BASE::Communicate( ) service 172 to store an I/O protected list 180 in SMRAM 26. As before, the I/O protect list may also be stored outside of SMRAM, wherein the location of the list is passed to the SMM Nub.

Figure 7:
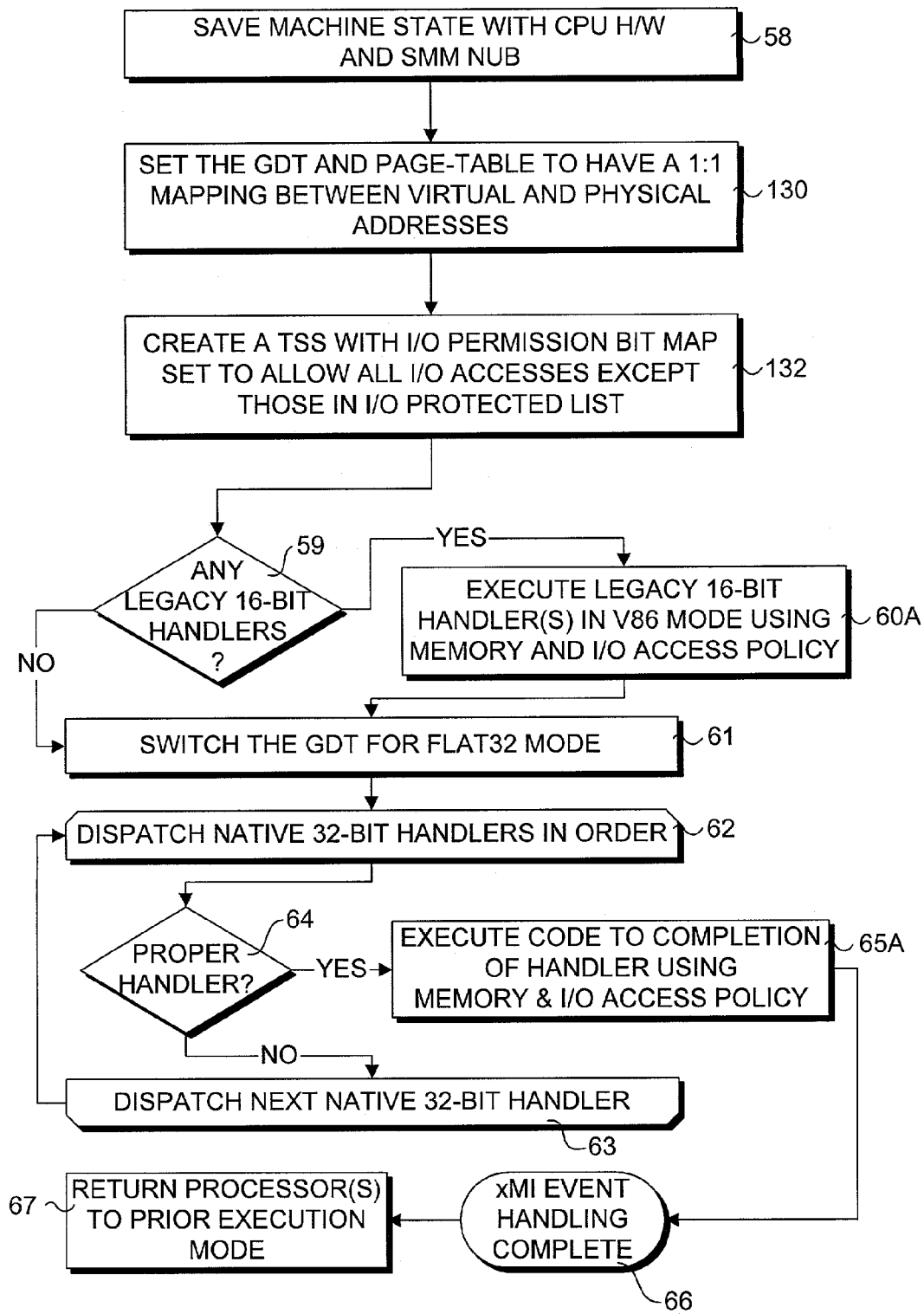
FIG. 7 is a flowchart illustrating the operations and logic used by one embodiment of the invention when handling an XMI event under a hardened extensible firmware framework.

With reference to FIG. 7, in accordance with one embodiment of the invention, the following operations are performed in response to an SMI event. Initially, operations provided in blocks 54, 55, 56, 57 (not shown in FIG. 7), and 58 are performed in a manner similar to that discussed above with reference to FIG. 2. Next, in a block 130, the global descriptor table (GDT) and the page-table are set to have a 1:1 mapping between virtual and physical addresses. In one embodiment in accordance with a built-in hardware scheme supported by IA-32 processors, this can be accomplished by programming register CR3 with the location of page directory 164 and enabling paging by setting the "PG" (paging) and "PE" (paging enable) bits in register CR0 to "1." If a software-based paging mechanism is used, the paging translations will be handled by mapping physical address into appropriate page and offset values that will depend on the internal partitioning invoked by the paging mechanism. The general principle is to set up a memory access mode that uses the paging information defined in memory paging map 152, whether that information is implemented via hardware or software.

As discussed above, one may want to protect access to selected I/O ports. In one embodiment corresponding to IA-32 processors, a TSS (Task State Segment) is created in a block 132 with its I/O permission bit map set to allow access to all I/O ports except those in I/O protected list 180. In many processors, I/O ports are mapped to the memory address space, and the protection of the I/O ports are handled in the similar manner to that discussed herein with respect to memory protection.

Figure 8:
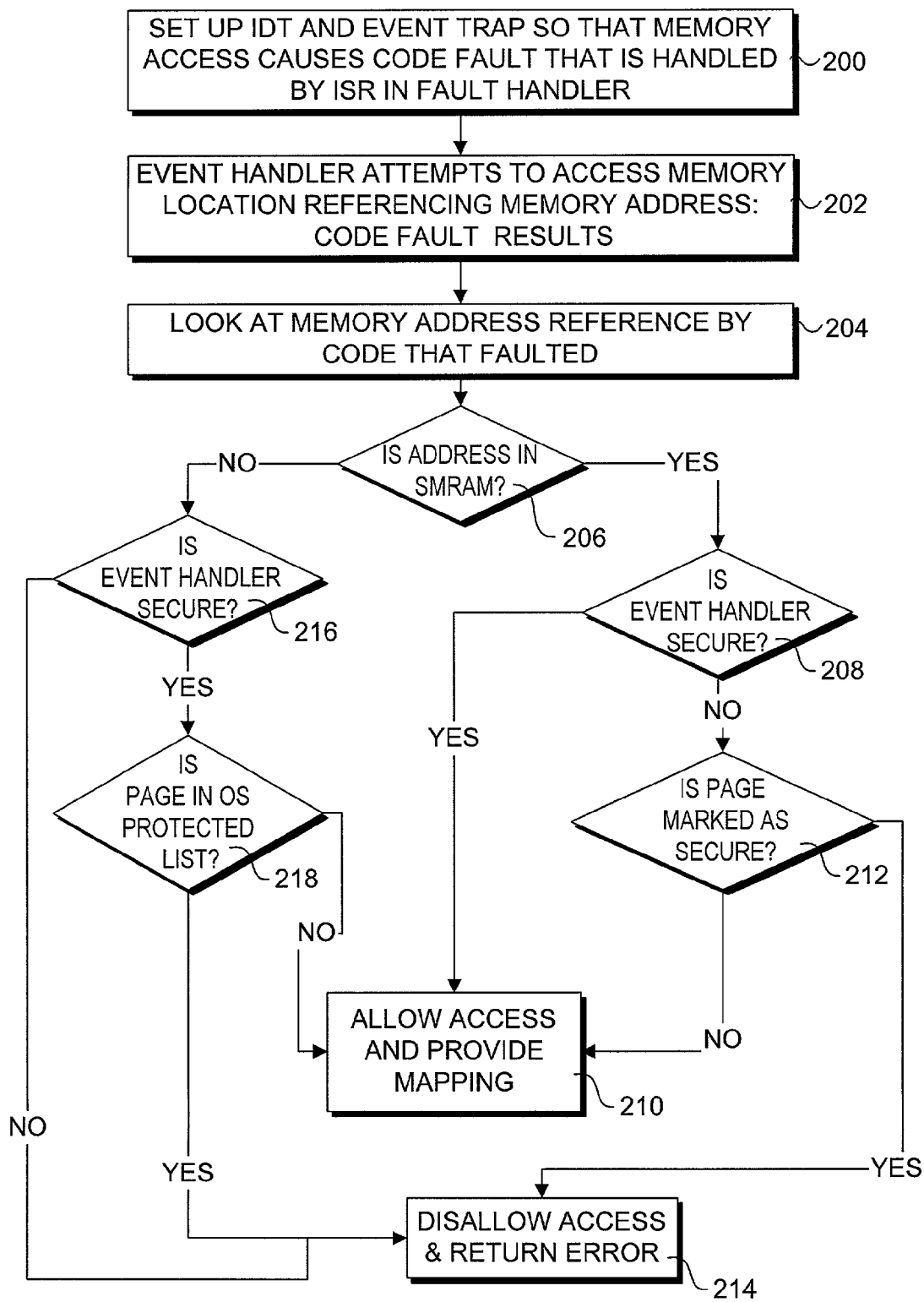
FIG. 8 is a flowchart illustrating the operations and logic used be a memory access policy to control access to system memory in accordance with one embodiment of the invention.
Figure 9:
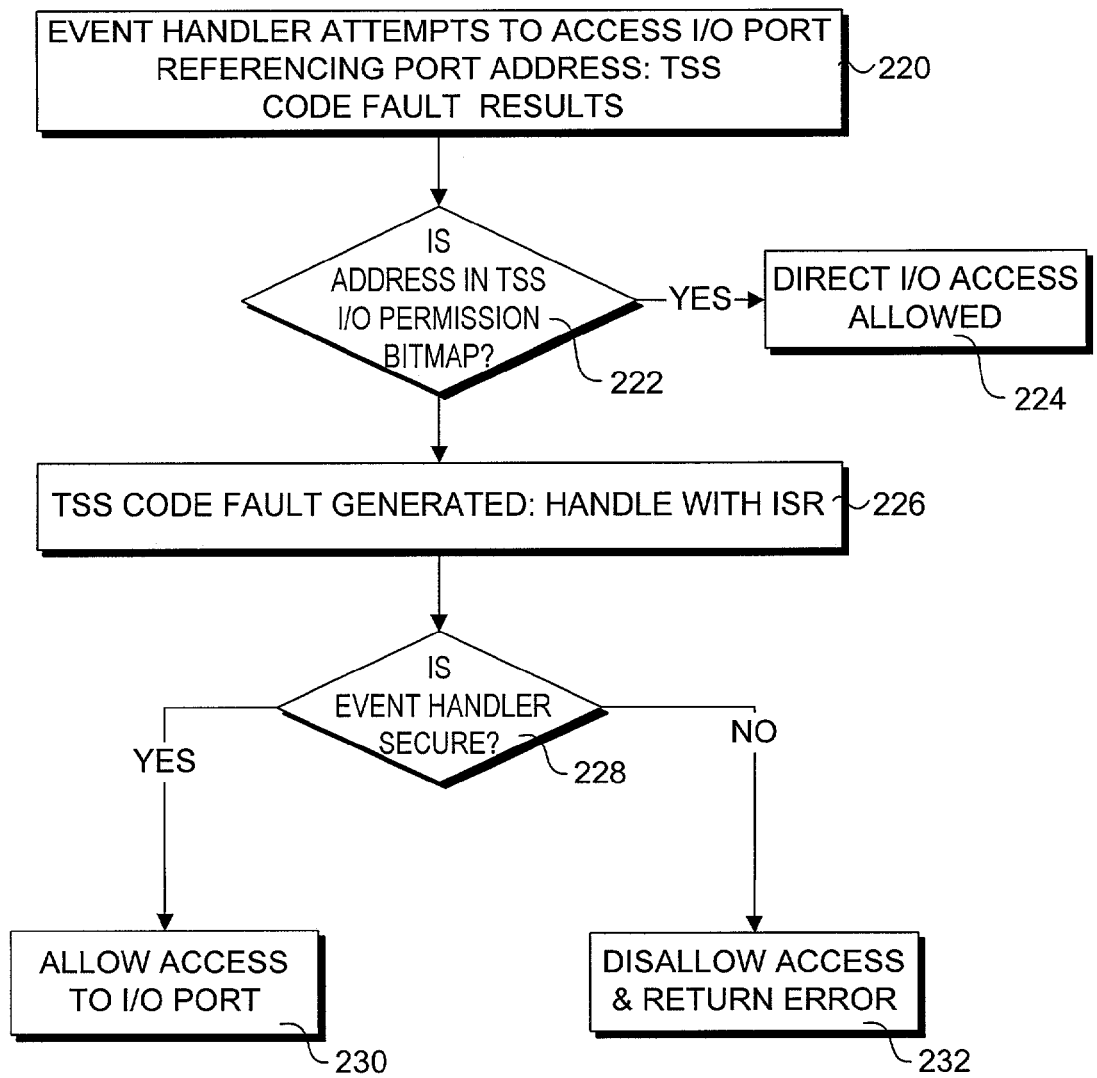
FIG. 9 is a flowchart illustrating the operations and logic used by an I/O access policy to control access to a system's I/O ports in accordance with one embodiment of the invention.

At this point, the processing proceeds in a similar manner to that discussed above for the conventional SMM event handler dispatching, except that the memory and I/O protection mechanisms are now enabled, as indicated by blocks 60A and 65A. Event handler operations when the memory protection is enabled in accordance with one embodiment of the invention are shown in FIG. 8. Event handler operations when the I/O protection is enabled in accordance with one embodiment of the invention are shown in FIG. 9.

With reference to the flowchart of FIG. 8, during SMM configuration operations interrupt description table 98 is set up so that memory accesses causes a code fault that is handled by a corresponding interrupt service routine (ISR) in fault handler 96, as depicted by a block 200. Beginning with a block 202, the following operations and logic are performed in response to a memory access while in SMM. In block 202, an event handler attempts to access a memory location, which results in a code fault. This invokes the ISR is fault handler 96, which uses a memory access policy defined in memory and I/O access policy component 95 to handle the fault condition.

First, in a block 204, the address of the code that faulted is examined. This address corresponds to the physical address (i.e., location) of the memory that was attempted to be accessed. In a decision block 206 a determination is made to whether the memory address corresponds to an SMRAM memory address. If the answer is YES, the logic proceeds to a decision block 208 in which a determination is made to whether the event handler attempting the memory access is secure. In one embodiment, this can be ascertained by examining the value corresponding to secure flag column 160 for the event handler. If the event handler has been deemed secure, the logic proceeds to a block 210 in which the memory access is allowed, and an appropriate mapping to the memory address is provided.

If the answer to decision block 208 is NO, a determination is made in a decision block 212 to whether the memory page corresponding to the memory address is marked as secure (i.e., privileged). If it has not, then the operations in block 210 are performed in the manner discussed above. If the memory page is marked as secure, access to the memory is disallowed and an error code is returned to the handler, as depicted by a block 214.

If the memory address doesn't correspond to memory contained in the SMRAM, the answer to decision block 206 is NO, causing the logic to proceed to a decision block 216 in which a determination is made to whether the event handler is secure. If the event handler is not secure, the logic flows to decision block 214, thereby denying access to the memory. If the event handler is secure, the logic proceeds to a decision block 218 in which a determination is made to whether the memory page corresponding to the memory address is a memory page contained in OS protected list 180. As discussed above, in an optional embodiment, OS protected list 180 comprises a list of address ranges rather than memory pages. In this case, a determination would be made to whether the memory address falls within one of the address ranges contained in the OS protected list. If the address falls within a page or address range that is marked as protected, the logic proceeds to block 214, denying access to the memory. If the memory address corresponds to an unprotected portion of memory, the logic proceeds to block 210, wherein access to the memory is allowed.

The foregoing is illustrative of just one potential memory access policy. The actual policy used may be determined on the particularities of the implementation. For example, it may be desired to block access to any memory that is not in SMRAM, regardless of whether the event handler requesting access is secure or not. In another implementation, a secure memory handler could be provided access to all memory.

In general, for processors that map I/O ports to memory addresses, the operations performed in the flowchart of FIG. 8 may be implemented to allow or deny access to I/O ports in a similar manner described above for protecting memory access. However, in this instance, if access is allowed, an I/O port corresponding to the memory address would be accessed, rather than a memory location.

With reference to FIG. 9, an I/O access protection scheme that uses the Task State Segment I/O protection mechanism operates as follows. In a block 220 an event handler attempts to access an I/O port referencing its port address. In accordance with a decision block 222 a determination is made to whether the port address is one of the port address that permission to access is allowed for as defined by the TSS I/O permission bitmap. In practice, the result of this decision is automatically performed by the processor through internal operations. If the answer to decision block 222 is YES, direct access to the I/O port is allowed, as depicted by a block 224.

In the event that a request to access an I/O port having a port address that is not included in the I/O permission bitmap is performed, a TSS code fault will be generated in a block 226. The code fault will then be handled by an ISR stored in fault handler 96 using the following operations and logic. In a decision block 228 a determination is made to whether the event handler is secure. If it is secure, access to the I/O port is allowed in accordance with a block 230. If not, access to the I/O port is disallowed, and an error code is returned to the event handler in a block 232.

In general, the handling of an SMI with an IA-32 processor and a PMI with an Itanium-class processor encompasses similar processes. However, there are some differences. A primary difference between is that the Itanium™ processors do not have a special CPU mode entered upon activation of its xMI signal. Rather, Itanium™ processors only provide a mechanism to bind a handler into the processor to handle a PMI event. This binding is effected via a registration call into the Processor Abstraction Layer (PAL), which is firmware provided by Intel for all Itanium platform builders, and comprises part of the Itanium architecture that is used to provide a consistent firmware interface to abstract processor implementation-specific features.

Figure 10:
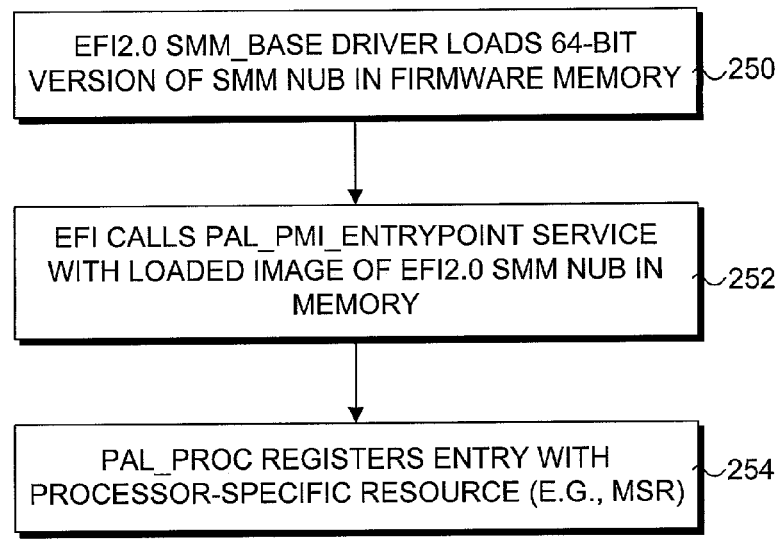
FIG. 10 is a flowchart illustrating operations performed during registering event handlers for servicing processor management interrupt (PMI) events with an Itanium™ processor.
Figure 11:
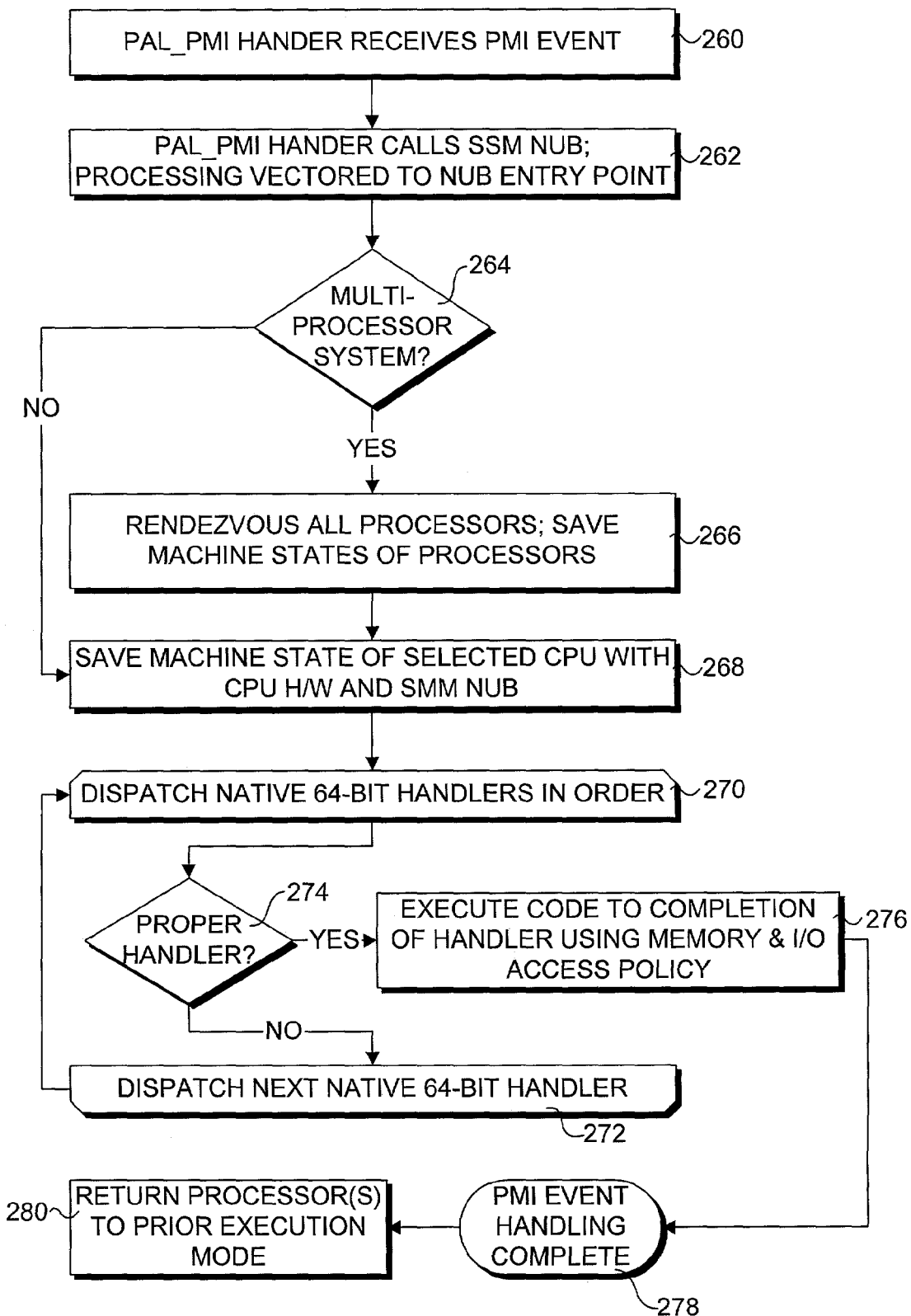
FIG. 11 is a flowchart illustrating operations and logic performed during handling of a PMI event in accordance with one embodiment of the invention.

Details of registering a handler and handling a PMI event with an Itanium™ processor are shown in FIGS. 10 and 11, respectively. The registration process begins in a block 250, in which the EFI2.0 SMM_BASE driver loads a 64-bit version of the SMM Nub in "firmware reserved" memory. Firmware reserved memory comprises a portion of memory that is designed to hold firmware components similar those discussed above with reference to the SMRAM used for IA-32 processors. Upon loading the SMM Nub, the EFI calls the PAL_PMI_ENTRYPOINT service with the loaded image of the Nub in memory in a block 252, which creates an entry point into the Nub code.

During initialization, the PAL publishes a set of services called PAL_PROCS. One of these PAL_PROCS is then used to register the entry point with an appropriate processor-specific resource, such as the processor's model-specific registers (MSR). Registration of the entrypoint thereby creates a binding between the processor and the set of PMI event handlers that are accessed via the SMM Nub. These operations are performed in a block 254.

With reference to FIG. 11, PMI event handling may then be performed as follows. In a block 260, a PAL_PMI event handler receives a PMI event. The PAL_PMI event handler then calls the SMM Nub in a block 262, which causes the processing of a processor that is selected to perform extensible PMI event handling to be vectored to the Nub entry point that was registered above. In a decision block 264, a determination is made to whether the system is a multiprocessor system. If the answer is yes, all of the processors are rendezvoused in a block 266, whereby all but a selected processor (e.g., the first processor that is identified during the pre-boot process) are halted while the SMM Nub in the selected processor is executed. The machine state of each CPU is then saved by both the CPU hardware and the SMM Nub in a block 268.

Once the machine state(s) of the processor(s) has/have been saved, native 64-bit handlers are dispatched in order until an appropriate event handler is executed to completion to service the PMI event, as provided by start loop and end loop blocks 270 and 272. As before, in one embodiment the event handlers are stored as a linked list that is traversed in order from top to bottom, wherein a first event handler is dispatched and additional event handlers are dispatched as needed. Each event handler contains a first portion of code that is used to determine if that handler is the proper handler for servicing the xMI event, as provided by a decision block 274, which may typically include interrogation of a corresponding hardware component in the manner discussed above. If a currently executed event handler is determined to be the appropriate handler, that event handler is executed to completion in a block 276 using a memory and I/O protection mechanism defined for the processor, whereupon it returns a code to the SMM Nub indicating that it has serviced the PMI event in a return block 278. If the event handler determines that it is not the appropriate handler for the PMI event, it returns a code to the SMM Nub indicating such, and the SMM Nub dispatches the next event handler in the list. In a manner similar to that discussed above for SMI event handling, this process is repeated until the appropriate event handler is executed.

Upon acknowledgment of the PMI event being handled, SMM Nub restores the machine state and executes an appropriate instruction (RSI) for the processor/all processors to return the processor(s) to its/their previous processing mode in a block 280.

In general, the operations and logic shown in the flowcharts of FIGS. 8 and 9 may be applied in an analogous manner to an Itanium™ processor.

Exemplary Machine for Implementing the Embodiments of the Invention

Figure 12:
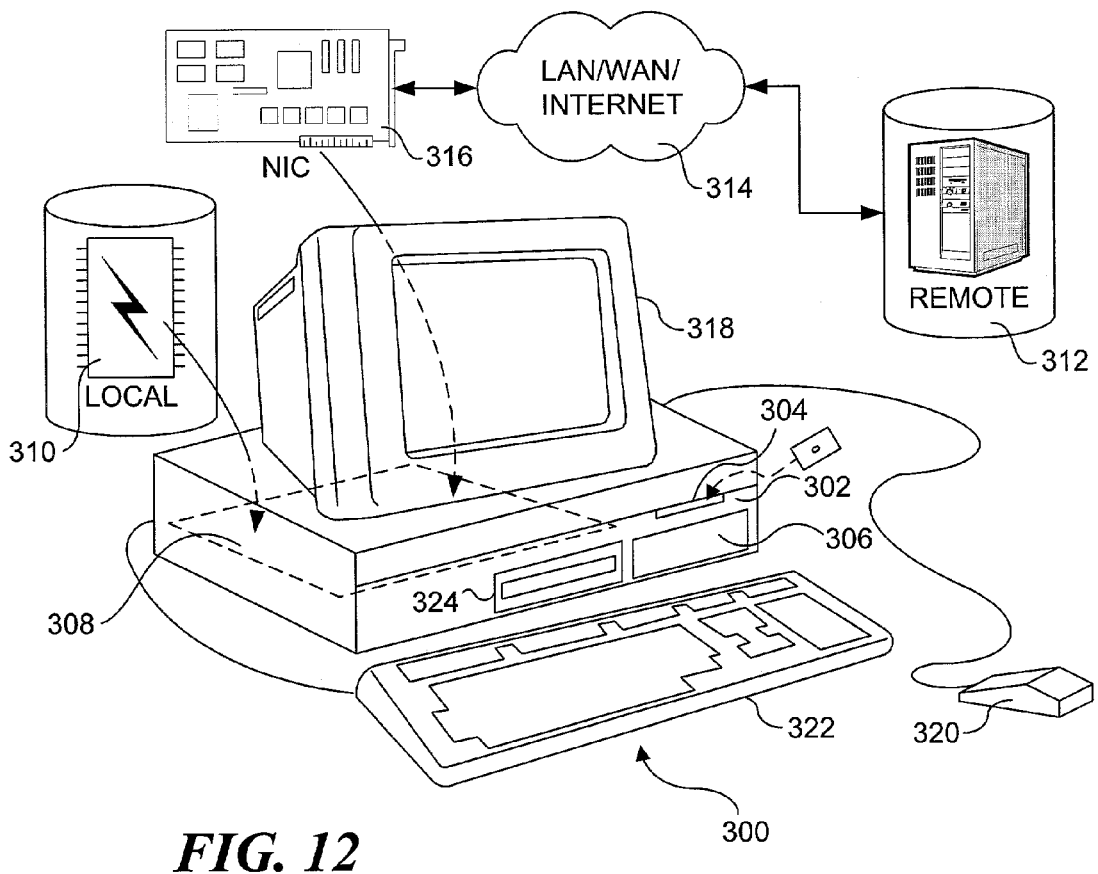
FIG. 12 is a schematic diagram of a personal computer system suitable for implementing embodiments of the invention disclosed herein.

With reference to FIG. 12, a generally conventional personal computer 300 is illustrated, which is generally suitable for use in connection with practicing the embodiments of the invention disclosed herein. Hardened extensible firmware frameworks may also be implemented on workstations, laptops, and computer servers in a similar manner. Personal computer 300 includes a processor chassis 302 in which are mounted a floppy disk drive 304, a hard drive 306, a motherboard 308 populated with appropriate integrated circuits including one or more microprocessors and memory modules (both not shown), and a power supply (also not shown), as are generally well known to those of ordinary skill in the art. Motherboard 308 also includes a local firmware storage device 310 (e.g., flash memory) on which the base portion of the BIOS firmware is stored. To facilitate access to a portion of the BIOS firmware that may be retrieved from a remote firmware storage device 312 via a network 314, personal computer 300 includes a network interface card 316 or equivalent circuitry built into motherboard 308. Network 314 may comprise a LAN, WAN, and/or the Internet, and may provide a wired or wireless connection between personal computer 300 and remote firmware storage device 312.

A monitor 318 is included for displaying graphics and text generated by software programs that are run by the personal computer and which may generally be displayed during the POST (Power-On Self Test) and other aspect of firmware load/execution. A mouse 320 (or other pointing device) is connected to a serial port (or to a bus port) on the rear of processor chassis 302, and signals from mouse 320 are conveyed to motherboard 308 to control a cursor on the display and to select text, menu options, and graphic components displayed on monitor 318 by software programs executing on the personal computer. In addition, a keyboard 322 is coupled to the motherboard for user entry of text and commands that affect the running of software programs executing on the personal computer.

Personal computer 300 also optionally includes a compact disk-read only memory (CD-ROM) drive 324 into which a CD-ROM disk may be inserted so that executable files and data on the disk can be read for transfer into the memory and/or into storage on hard drive 306 of personal computer 300. If the base BIOS firmware is stored on a rewriteable device, such as a flash device, machine instructions for updating the base portion of the BIOS firmware may be stored on a CD-ROM disk or a floppy disk and read and processed by the computer's processor to rewrite the BIOS firmware stored on the rewritable device. Updateable BIOS firmware may also be loaded via network 314.

In the foregoing discussion, embodiments of the invention are disclosed that are implemented with processors having IA-32 and Itanium™ architectures. This is not meant to be limiting. Rather, the principles and teachings disclosed herein may be applied to any processor architecture that supports a hidden or operating system transparent execution mode, or provides support for handling system management events in an OS-transparent manner.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method comprising:
defining a resource access policy that defines rules to allow or disallow access to a designated system resource;
determining a security status of a firmware-based event handler; and
allowing access to the designated system resource in response to a corresponding access request during execution of the firmware-based event handler based on the security status of the firmware-based event handler and the resource access policy,
wherein the resource access policy corresponds to a memory access policy that prevents access to non-trusted event handlers from accessing memory allocated to trusted code and an input/output (I/O) port access policy that prevents access to a computer system's I/O port if an I/O port event handler is non-secure, the memory access policy uses a memory paging mechanism that includes a plurality of page table entries, each defining a security status of a memory page to which the page table entry corresponds, and the memory paging mechanism is hardware-based, and the processor automatically generates a code fault in response to an attempt to access a memory location, and in response to a code fault performing the operations of, determining a security status of a memory page corresponding to the memory access request; and determining whether the memory access request should be allowed based on a combination of the security status of the memory page and the security status of the firmware-based event handler as defined by the memory access policy.

2. The method of claim 1, wherein the firmware-based event handler is executed by a processor in a manner that is transparent to an operating system running on a computer system in which the processor is implemented.

3. The method of claim 1, wherein the memory access policy enables an operating system to define selected portions of system memory to restrict access to.

4. The method of claim 1, wherein the memory access policy considers whether the memory requested to be accessed by the firmware-based event handler is deemed to be trusted.

5. The method of claim 1, wherein the I/O port access policy enables an operating system to define selected I/O ports to restrict access to.

6. The method of claim 1, the determining the security status includes authenticating the firmware-based event handler.

7. A method for hardening a System Management Mode (SMM) of a microprocessor, comprising:

defining a resource access policy that defines rules to allow or disallow access to a designated system resource of a computer system in which the microprocessor is used;

switching the microprocessor to SMM in response to an SMM triggering event;

executing the event handler to service the SMM triggering event;

determining a security status of the event handler; and allowing access to the designated system resource if a corresponding access is requested during execution of the event handler based on the security status of the event handler and any applicable rules defined by the resource access policy, wherein the resource access policy corresponds to a memory access policy that prevents access to non-trusted event handlers from accessing memory allocated to trusted code and an input/output (I/O) port access policy that prevents access to selectable I/O ports corresponding to the computer system if an I/O port event handler is determined to be non-secure, the I/O access policy is implemented by performing the operations of:

defining an I/O protected list identifying I/O ports to which access may be restricted; and creating a Task State Segment (TSS) with an I/O permission bit map set to allow access to all I/0 ports except the I/O ports in the I/O protected list; and a code fault is generated in response to an attempt to access an I/O port in the I/O protected list, further comprising determining whether to allow access to the I/O port based on the security status of the event handler.

8. The method of claim 7, wherein the memory access policy restricts access to non-System Management memory (SMRAM).

9. A method for handling a Platform Management Interrupt (PMI) event in a processor, comprising:

defining a resource access policy that defines rules to allow or disallow access to a designated system resource of a computer system in which the processor is used; and in response to the PMI event, vectoring the processor to begin executing a PMI event-handling management service that is used to dispatch one or more PMI event handlers for execution to service the PMI event;

determining a respective security status of said one or more PMI event handlers; and allowing access to the designated system resource if a corresponding access is requested during execution of said one or more PMI event handlers based on the security status of the said one or more PMI event handlers and any applicable rules defined by the resource access policy, wherein the resource access policy corresponds to a memory access policy that prevents access to non-trusted event handlers from accessing memory allocated to trusted code and an input/output (I/O) port access policy that prevents access to selectable I/O ports corresponding to the computer system if an I/O port event handler is determined to be non-secure.

10. The method of claim 9, wherein the resource access policy enables an operating system to define selected portions of system memory to restrict access to.

11. A machine-readable media having instructions stored thereon that when executed by a computer system performs the operations of:

retrieving data comprising a resource access policy that defines rules to allow or disallow access to a designated system resource of the computer system;

determining a security status of a firmware-based event handler; and allowing access to the designated system resource if a corresponding access is requested during execution of the firmware-based event handler based on the security status of the firmware-based event handler and the resource access policy, wherein the resource access policy corresponds to a memory access policy that prevents access to non-trusted event handlers from accessing memory allocated to trusted code and an input/output (I/O) port access policy that prevents access to selectable I/O ports corresponding to the computer system if an I/O port event handler is determined to be non-secure, the memory access policy uses a memory paging mechanism that includes a plurality of page table entries, each defining a security status of a memory page to which the page table entry corresponds, and execution of the instructions further performs the operations of:

configuring an event trap to generate a code fault in response to a memory access request by the firmware-based event handler; and in response to a code fault, determining a memory page corresponding to the memory access request;

determining a security status of the memory page; and determining whether the memory access request should be allowed based on a combination of the security status of the memory page and the security status of the firmware-based event handler as defined by the memory access policy.

12. The machine-readable media of claim 11, wherein the firmware-based event handler is executed in response to a system management event using a System Management Mode (SMM) of a processor in the computer system.

13. The machine-readable media of claim 11, wherein the firmware-based event handler is executed in response to a Platform Management Interrupt (PMI) event.

14. A method comprising:
defining a resource access policy that defines rules to allow or disallow access to a designated system resource;
determining a security status of a firmware-based event handler; and
allowing access to the designated system resource in response to a corresponding access request during execution of the firmware-based event handler based on the security status of the firmware-based event handler and the resource access policy,
wherein the resource access policy corresponds to a memory access policy that prevents access to non-trusted event handlers from accessing memory allocated to trusted code and an input/output (I/O) port access policy that prevents access to a computer system's I/O port if an I/O port event handler is non-secure, the memory access policy uses a memory paging mechanism that includes a plurality of page table entries, each defining a security status of a memory page to which the page table entry corresponds, and the memory paging mechanism is software-based, further comprising:
configuring an event trap to generate a code fault in response to a memory access request by the firmware-based event handler; and
in response to a code fault performing the operations of,
determining a memory page corresponding to the memory access request;
determining a security status of the memory page; and
determining whether the memory access request should be allowed based on a combination of the security status of the memory page and the security status of the firmware-based event handler as defined by the memory access policy.

15. The method of claim 14, wherein the firmware-based event handler is executed by a processor in a manner that is transparent to an operating system running on a computer system in which the processor is implemented.

16. The method of claim 14, wherein the memory access policy enables an operating system to define selected portions of system memory to restrict access to.

17. The method of claim 14, wherein the memory access policy considers whether the memory requested to be accessed by the firmware-based event handler is deemed to be trusted.

18. The method of claim 14, wherein the I/O port access policy enables an operating system to define selected I/O ports to restrict access to.

19. The method of claim 14, the determining the security status includes authenticating the firmware-based event handler.

* * * * *

UNITED STATES PATENT AND TRADEMARK OFFICE
CERTIFICATE OF CORRECTION

| | |
|---|---|
| PATENT NO. | : 7,260,848 B2 |
| APPLICATION NO. | : 10/120865 |
| DATED | : August 21, 2007 |
| INVENTOR(S) | : Zimmer |

Page 1 of 1

It is certified that error appears in the above-identified patent and that said Letters Patent is hereby corrected as shown below:

In column 9, at line 16, delete "modem" and insert --modern--.

In column 9, at line 41, delete "standard3" and insert --standaradv3--.

In column 10, at line 9, delete "modem" and insert --modern--.

In column 15, at line 62, delete "I/0" and insert --I/O--.

Signed and Sealed this

Fifteenth Day of April, 2008

JON W. DUDAS
*Director of the United States Patent and Trademark Office*